C. G. POLLEYS.
SHOCK ABSORBER FOR VEHICLES.
APPLICATION FILED APR. 6, 1910.
979,694.
Patented Dec. 27, 1910.
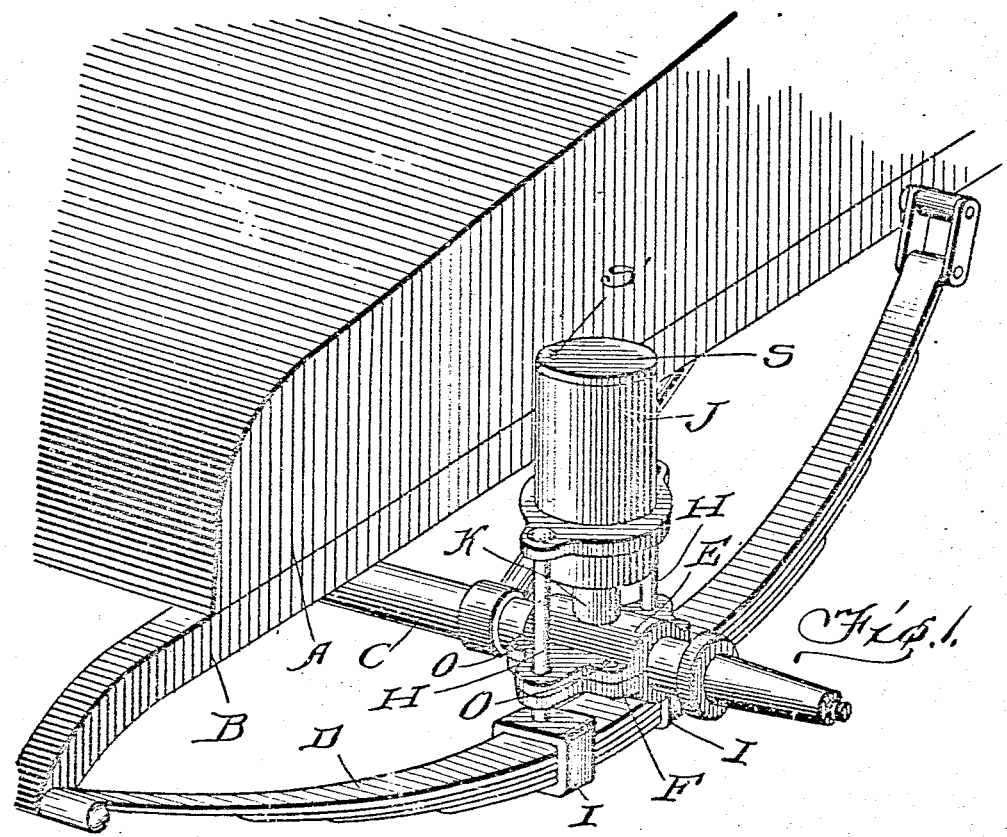
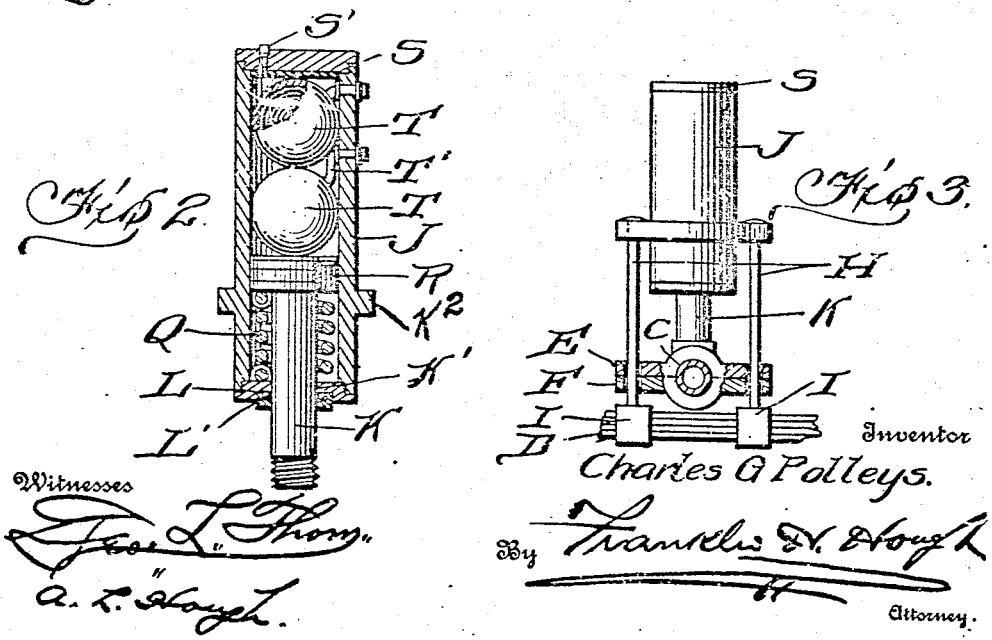

UNITED STATES PATENT OFFICE.

CHARLES G. POLLEYS, OF MALDEN, MASSACHUSETTS, ASSIGNOR OF ONE-HALF TO F. C. TAFT, OF UXBRIDGE, MASSACHUSETTS.

SHOCK-ABSORBER FOR VEHICLES.

979,694.  Specification of Letters Patent.  Patented Dec. 27, 1910.

Application filed April 6, 1910. Serial No. 553,681.

*To all whom it may concern:*

Be it known that I, CHARLES G. POLLEYS, a citizen of the United States, residing at Malden, in the county of Middlesex and State of Massachusetts, have invented certain new and useful Improvements in Shock-Absorbers for Vehicles; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in means for taking up vibration upon vehicles of various kinds without the use of cushion or pneumatic tires and comprises various details of construction and combinations and arrangements of parts which will be hereinafter fully described and then specifically defined in the appended claim.

I illustrate my invention in the accompanying drawings, in which:—

Figure 1 is a perspective view showing the application of my appliance to the axle and spring of a vehicle. Fig. 2 is a detail sectional view, and Fig. 3 is a detail view in elevation, a portion being shown in section.

Reference now being had to the details of the drawings by letter, A designates the body of a vehicle and B a side bar. D designates one of the leaf springs upon a vehicle connected to said bar.

Bearing plates, designated respectively by letters E and F, are clamped over the axle. Laterally projecting wings of said bearing plates are provided with registering apertures for the reception of the rods H, the lower ends of which have fixed thereto sleeves I which surround the spring D, one upon either side of the axle. Said bearing plates are held together by means of screws G or any other suitable fastening means and rising from the plate E is a plunger stem K which passes through an opening K' in the bottom of the cylinder J and about the apertures in the bottom of said cylinder through which the plunger stem passes is a groove L in which anti-friction balls L' are seated and adapted to prevent the plunger stem from contact with the marginal edges of the opening or aperture. Said cylinder J has an integral flange K² which is apertured for the reception of the upper ends of the bolts H which are fixed to said flange K² and afford means for supporting the cylinder.

Mounted within the cylinder are the tension springs Q, fastened at their lower ends to the bottom of the receptacle and their upper ends to the plunger head and the purpose of said coiled springs is to limit the inner movement of the plunger head within the cylinder. It will be understood that the coiled spring Q, one end of which is fastened to the piston R and its other end to the movable end of the cylinder, serves as a tension spring, having a tendency to normally hold the cylinder in the position shown in Fig. 2 of the drawings, said spring being put under tension as the cylinder connected to the leaf spring moves downward. The top S of said cylinder preferably has threaded connection with the cylinder and has an adjustable valve S' adapted to regulate the discharge of air from the cylinder.

Mounted within the cylinders and above the plunger head are the rubber balls T, each of which has a filling tube T' extending through an aperture in the circumference of the cylinder and affording means whereby said balls may be inflated by any suitable air pump.

A check valve, designated by letter R, is formed in the plunger head and serves to allow the air to enter the space above the plunger head within the cylinder as the cylinder moves upward after having been depressed against the tension of the rubber balls within the cylinder.

By the provision of the apparatus as shown and described, it will be noted that a simple and efficient means is afforded whereby vibration incident to the movement of a vehicle when in motion may be absorbed, dispensing with the use of the pneumatic and cushion tires.

What I claim to be new is:—

A vehicle attachment for taking up vibrations comprising, in combination with the axle and leaf spring of a running gear, winged clamping plates fastened to the axle, a piston having a stem fixed to one of said plates, a cylinder in which said piston is mounted, collars fitted about the leaf spring, rods projecting therefrom and movable through registering apertures in said clamping plates, an integral flange upon said cylinder fastened at its upper ends to said rods, cushion balls mounted within the cylinder intermediate the top of the latter and said piston, and a tension spring fastened at one end to the under side of said piston and its other end to the bottom of the cylinder.

In testimony whereof I hereunto affix my signature in the presence of two witnesses.

CHARLES G. POLLEYS.

Witnesses:
A. L. HOUGH,
FRANKLIN H. HOUGH.